United States Patent
Cronin et al.

(10) Patent No.: US 10,290,067 B1
(45) Date of Patent: May 14, 2019

(54) WIRELESS CONCESSION DELIVERY

(71) Applicant: ProSports Technologies, LLC, Miami, FL (US)

(72) Inventors: John Cronin, Bonita Springs, FL (US); Maxx Garrison, Burlington, VT (US)

(73) Assignee: PROSPORTS TECHNOLOGIES, LLC, Miami, FL (US)

( * ) Notice: Subject to any disclaimer, the term of this patent is extended or adjusted under 35 U.S.C. 154(b) by 374 days.

(21) Appl. No.: 14/732,394

(22) Filed: Jun. 5, 2015

Related U.S. Application Data (60) Provisional application No. 62/008,491, filed on Jun. 5, 2014.

(51) Int. Cl.
*G06Q 50/12* (2012.01)
*H04W 4/02* (2018.01)

(52) U.S. Cl.
CPC .............. *G06Q 50/12* (2013.01); *H04W 4/02* (2013.01)

(58) Field of Classification Search
None
See application file for complete search history.

(56) References Cited

U.S. PATENT DOCUMENTS

| | | | |
|---|---|---|---|
| 6,329,919 B1 | 12/2001 | Boies et al. | |
| 6,778,085 B2 | 8/2004 | Faulkner et al. | |
| 7,671,730 B2 | 3/2010 | Henderson | |
| 7,715,723 B2 | 5/2010 | Kagawa et al. | |
| 7,724,131 B2 | 5/2010 | Chen | |
| 7,778,855 B2 | 8/2010 | Holliday | |
| 7,929,867 B2 | 4/2011 | Nakagawa | |
| 7,970,537 B2 | 6/2011 | Ann et al. | |
| 8,126,782 B1 | 2/2012 | Zhu et al. | |
| 8,188,878 B2 | 5/2012 | Pederson et al. | |
| 8,275,096 B2 | 9/2012 | Neece | |
| 8,589,667 B2 | 11/2013 | Mujtaba et al. | |

(Continued)

FOREIGN PATENT DOCUMENTS

| | | |
|---|---|---|
| CN | 102843186 | 12/2012 |
| KR | 10-2008005025 | 6/2008 |

(Continued)

OTHER PUBLICATIONS

Bandela et al.; Praveen; "Li-Fi (Light Fidelity): The Next Generation of Wireless Network", International Journal of Advanced Trends in Computer Science and Engineering, vol. 3, No. 1, pp. 132-137 (2014).

(Continued)

*Primary Examiner* — Nathan C Uber
*Assistant Examiner* — Denisse Y Ortiz Roman
(74) *Attorney, Agent, or Firm* — Polsinelli LLP (57) ABSTRACT

The present disclosure concerns a wireless concession system that transmits the availability of various concessions from both mobile vendors as well as actual concession stands. The system identifies the location of these concession offerings in real time as well as up-to-date status information concerning the same. Wireless transmission of information concerning an attendee at a sporting event may likewise be broadcast to the concession system such that delivery of a desired concession may take place using an optimal delivery method, which could be delivery or pick-up at a location most near and most efficient for the needs of the attendee.

20 Claims, 3 Drawing Sheets

(56) References Cited

U.S. PATENT DOCUMENTS

| | | | |
|---|---|---|---|
| 8,611,930 B2 | 12/2013 | Louboutin et al. |
| 8,620,344 B2 | 12/2013 | Huang et al. |
| 8,626,465 B2 | 1/2014 | Moore et al. |
| 8,630,216 B2 | 1/2014 | Deivasigamani et al. |
| 8,660,501 B2 | 2/2014 | Sanguinetti |
| 8,706,044 B2 | 4/2014 | Chang et al. |
| 8,724,723 B2 | 5/2014 | Panicker et al. |
| 8,750,207 B2 | 6/2014 | Jeong et al. |
| 8,789,175 B2 | 7/2014 | Hubner et al. |
| 8,793,094 B2 | 7/2014 | Tam et al. |
| 8,816,868 B2 | 8/2014 | Tan et al. |
| 8,831,529 B2 | 9/2014 | Toh et al. |
| 8,831,655 B2 | 9/2014 | Burchill et al. |
| 8,836,851 B2 | 9/2014 | Brunner |
| 8,843,158 B2 | 9/2014 | Nagaraj |
| 8,849,308 B2 | 9/2014 | Marti et al. |
| 8,862,060 B2 | 10/2014 | Mayor |
| 8,863,172 B2 | 10/2014 | Hardin et al. |
| 8,873,418 B2 | 10/2014 | Robinson et al. |
| 8,874,090 B2 | 10/2014 | Abuan et al. |
| 8,917,632 B2 | 12/2014 | Zhou et al. |
| 8,934,921 B2 | 1/2015 | Marti et al. |
| 9,054,800 B2 | 6/2015 | Suresh et al. |
| 9,449,121 B2 | 9/2016 | Marti |
| 9,607,497 B1 | 3/2017 | Cronin |
| 9,892,371 B1 | 2/2018 | Cronin |
| 9,965,938 B1 | 5/2018 | Cronin |
| 2002/0167408 A1 | 11/2002 | Trajkovic et al. |
| 2003/0014749 A1 | 1/2003 | Simons et al. |
| 2003/0036936 A1 | 2/2003 | Steichen et al. |
| 2003/0102956 A1 | 6/2003 | McManus et al. |
| 2004/0260513 A1 | 12/2004 | Fitzpatrick et al. |
| 2006/0273920 A1 | 12/2006 | Doan et al. |
| 2007/0055554 A1 | 3/2007 | Sussman et al. |
| 2009/0112638 A1 | 4/2009 | Kneller et al. |
| 2009/0249342 A1 | 10/2009 | Johnson |
| 2009/0319306 A1 | 12/2009 | Chanick |
| 2010/0141480 A1 | 6/2010 | Brooks et al. |
| 2011/0029894 A1* | 2/2011 | Eckstein ............... G06Q 20/32 715/753 |
| 2011/0173041 A1* | 7/2011 | Breitenbach ..... G06Q 10/06311 705/7.13 |
| 2011/0179041 A1* | 7/2011 | Souto .................... G06F 9/5011 707/748 |
| 2011/0307547 A1 | 12/2011 | Backer et al. |
| 2012/0078667 A1 | 3/2012 | Denker et al. |
| 2012/0116863 A1 | 5/2012 | Boss et al. |
| 2012/0130761 A1* | 5/2012 | Mohan ............... G06Q 10/0631 705/7.12 |
| 2012/0154169 A1 | 6/2012 | Hoekstra |
| 2012/0207350 A1 | 8/2012 | Loos |
| 2012/0215637 A1* | 8/2012 | Hermann ........... G06Q 30/0207 705/14.53 |
| 2012/0315868 A1 | 12/2012 | Ben-Alexander |
| 2013/0126713 A1 | 5/2013 | Haas et al. |
| 2013/0141555 A1 | 6/2013 | Ganick et al. |
| 2013/0183924 A1 | 7/2013 | Saigh et al. |
| 2013/0211715 A1 | 8/2013 | Bae et al. |
| 2013/0279917 A1 | 10/2013 | Son et al. |
| 2013/0303192 A1 | 11/2013 | Louboutin |
| 2013/0317835 A1 | 11/2013 | Mathew |
| 2013/0317944 A1 | 11/2013 | Huang et al. |
| 2013/0328917 A1 | 12/2013 | Zhou |
| 2013/0331087 A1 | 12/2013 | Shoemaker |
| 2013/0331118 A1 | 12/2013 | Chhabra |
| 2013/0331137 A1 | 12/2013 | Burchill |
| 2013/0332108 A1 | 12/2013 | Patel |
| 2013/0332156 A1 | 12/2013 | Tackin |
| 2013/0332208 A1 | 12/2013 | Mehta |
| 2013/0336662 A1 | 12/2013 | Murayama et al. |
| 2013/0343762 A1 | 12/2013 | Murayama et al. |
| 2014/0046802 A1 | 2/2014 | Hosein et al. |
| 2014/0055619 A1 | 2/2014 | Holland et al. |
| 2014/0062773 A1 | 3/2014 | MacGougan |
| 2014/0065962 A1 | 3/2014 | Le |
| 2014/0071221 A1 | 3/2014 | Dave |
| 2014/0072119 A1 | 3/2014 | Hranilovic et al. |
| 2014/0105084 A1 | 4/2014 | Chhabra |
| 2014/0132400 A1 | 5/2014 | Heaven et al. |
| 2014/0139380 A1 | 5/2014 | Ouyang |
| 2014/0141803 A1 | 5/2014 | Marti |
| 2014/0162628 A1 | 6/2014 | Bevelacqua |
| 2014/0167794 A1 | 6/2014 | Nath |
| 2014/0168170 A1 | 6/2014 | Lazarescu |
| 2014/0171114 A1 | 6/2014 | Marti |
| 2014/0180820 A1 | 6/2014 | Louboutin |
| 2014/0191979 A1 | 7/2014 | Tsudik |
| 2014/0200053 A1 | 7/2014 | Balasubramanian |
| 2014/0222335 A1 | 8/2014 | Piemonte |
| 2014/0232633 A1 | 8/2014 | Shultz |
| 2014/0232634 A1 | 8/2014 | Piemonte |
| 2014/0241730 A1 | 8/2014 | Jovicic et al. |
| 2014/0247279 A1 | 9/2014 | Nicholas |
| 2014/0247280 A1 | 9/2014 | Nicholas |
| 2014/0269562 A1 | 9/2014 | Burchill |
| 2014/0274150 A1 | 9/2014 | Marti |
| 2014/0283135 A1 | 9/2014 | Shepherd |
| 2014/0293959 A1 | 10/2014 | Singh |
| 2014/0363168 A1 | 12/2014 | Walker |
| 2014/0364089 A1 | 12/2014 | Lienhart |
| 2014/0364148 A1 | 12/2014 | Block |
| 2014/0365120 A1 | 12/2014 | Vulcano |
| 2014/0375217 A1 | 12/2014 | Feri et al. |
| 2015/0011242 A1 | 1/2015 | Nagaraj |
| 2015/0026623 A1 | 1/2015 | Horne |
| 2015/0031397 A1 | 1/2015 | Jouaux |
| 2015/0038171 A1 | 2/2015 | Uilecan et al. |
| 2015/0049190 A1 | 2/2015 | Galvez et al. |
| 2015/0137986 A1 | 5/2015 | Kang et al. |
| 2016/0005053 A1 | 1/2016 | Klima et al. |

FOREIGN PATENT DOCUMENTS

| | | |
|---|---|---|
| KR | 10-1133539000 | 4/2012 |
| WO | WO 2009/104921 | 8/2009 |

OTHER PUBLICATIONS

Blau, John; "Security wins at German soccer stadium", Network World, Mar. 7, 2006.

Burchardt, Harald; "A Proposed Architecture for Short "Rolling Shutter" Messages", IEEE P802.15, Wireless Personal Area Networks, Mar. 2014.

"Challenge iBeacon Philips Smart LED communication system to locate commercial indoor lighting", by Sunricher, Feb. 18, 2014.

"Create Innovative Services with Play APPs", Date of Download: Jan. 16, 2014, http://www.oledcomm.com/LIFI.html, Oledcomm—France LiFi.

"Customer Retail Analytics", Nanuka Digital Solutions, Jun. 2, 2014.

Danakis, C et al.; "Using a CMOS Camera Sensor for Visible Light Communication"; 3rd IEEE Workshop on Optical Wireless Communications; [online], Dec. 3-7, 2012 [retrieved Aug. 14, 2015]. Retrieved from the Internet: <URL:https://195.134.65.236/IEEE_Globecom_2012/papers/p1244-danakis.pdf> pp. 1244-1248.

Dawson, Keith; "LiFi in the Real World" All LED Lighting—Illuminating the LED Community, Jul. 31, 2013.

Eng, James; "Beer lines at 49ers stadium: There's an app for that", MSN News, Jul. 31, 2013.

"Get the Conversion Advantage With LightHause Visual Customer Intelligence", Visual Customer Intelligence, Sep. 16, 2012.

Gorman, Michael; "Outstanding Technology brings visible light communication to phones and tablets via dongle and LEDs", Edgadget International Editions, Jul. 16, 2012.

Haas, Harald; "Delivering safe and secure wireless communications", pureLiFi. Date of download: Jan. 16, 2014 http://purelifi.co.uk/.

Kumar, Navin; "Visible Light Communications Systems Conception and VIDAS", IETE Technical Review, vol. 25, Issue 6, Nov.-Dec. 2008. Date of download: Nov. 19, 2009. http://www.tr.ietejournals.org.

(56) References Cited

OTHER PUBLICATIONS

Li, Yang et al., "VICO: A Framework for Configuring Indoor Visible Light Communication Networks" Aug. 11, 2012, Mobile Adhoc and Sensor Systems (MASS), 2012 IEEE 9th International Conference, Las Vegas, NV.
LiFi Overview—Green wireless mobile communication—LiFi Technology. Date of download: Jan. 16, 2014.
LIGHTimes Online—LED Industry News,Jun. 17, 2014.
Montero, Eric, "Design and Implementation of Color-Shift Keying for Visible Light Communications", Sep. 2013, McMaster University.
"Nextiva Retail Traffic Analytics—Understanding Shopper Behavior to Improve Sales and the Customer Experience", Verint. Video Intelligence Solution. Aug. 2010.
Nguyen et al., "A Novel like switching scheme using pre-scanning and RSS prediction in visible light communication networks", EURASIP Journal on Wireless Communications and Networking, 2013.
Ogawa; "Article about VLC Guidance developed", Visible Light Communications Consotium (VLCC), Aug. 31, 2012.
Ogawa; "iPhone app from CASIO", Visible Light Communications Consotium (VLCC), Apr. 26, 2012.
Povey, Gordon, "VLC for Location, positioning and navigation", Jul. 27, 2011, http://visiblelightcomm.com/vlc-for-location-positioning-and-n . . . .
"Smart lights help shoppers find groceries", Lux Magazine, Feb. 19, 2014.
Thanigavel, M.; "Li-Fi Technology in Wireless Communication", International Journal of Engineering Research & Technology (IJERT), ISSN: 2278-0181, vol. 2 Issue 10, Oct. 2013.
TrueView Queue—Manual, Embedded for Axis IP cameras, version 1.0, Mar. 7, 2014.
Valinsky, Jordan; "Madison Square Garden May Add a Bathroom Wait Time App So at Least You Can Enjoy Some Sort of Victory", Betabeat, Oct. 22, 2013.
Video Analytics: Understanding Rules and Exception-based Reporting—A 3xLOGIC Discussion Guide, Intelligent Video Surveillance. Oct. 19, 2011.
Won, Eun Tae; "Visible Light Communication: Tutorial", Project: IEEE P802.15 Working Group for Wireless Personal Area Networks (WPANs), Mar. 9, 2008.
PCT Application No. PCT/US2015/033613 International Search Report and Written Opinion dated Sep. 1, 2015.
U.S. Appl. No. 14/798,210 Office Action dated Oct. 16, 2015.
U.S. Appl. No. 14/798,291 Office Action dated Nov. 17, 2015.
U.S. Appl. No. 14/818,226 Office Action dated Sep. 28, 2015.
U.S. Appl. No. 14/798,210 Office Action dated Jan. 5, 2017.
U.S. Appl. No. 14/798,210 Final Office Action dated Apr. 27, 2016.
U.S. Appl. No. 14/798,291 Final Office Action dated Jun. 17, 2016.
U.S. Appl. No. 14/818,226 Final Office Action dated Apr. 1, 2016.
Chu, Liou; Hui, Lin; and Hung, Fu-Yi, "Simulation of Theme Park Queuing System by Using Arena", Oct. 16-18, 2013; Proceeding IIH-MSP '13 Proceedings of the 2013 Ninth International Conference on Intelligent Information Hiding and Multimedia Signal Processing, pp. 17-20.
U.S. Appl. No. 14/798,210 Office Action dated Oct. 4, 2017.
U.S. Appl. No. 14/798,210 Final Office Action dated Apr. 28, 2017.
U.S. Appl. No. 14/731,810 Office Action dated Aug. 7, 2018.
U.S. Appl. No. 14/798,210, John Cronin, Restroom Queue Management, filed Jul. 13, 2015.
U.S. Appl. No. 14/731,810, John Cronin, Concession Management, filed Jun. 5, 2015.
U.S. Appl. No. 14/798,291, John Cronin, Queue Information Transmission, filed Jul. 13, 2015.
U.S. Appl. No. 14/818,226, John Cronin, Wireless Communication Security System, filed Aug. 4, 2015.
Ben-Akiva, Moshe, et al.; "Dynamic Model of Peak Period Traffic Congestion With Elastic Arrival Rates", Transportation Science, 20, No. 2, 164-181 Aug. 1986.
U.S. Appl. No. 14/731,810 Final Office Action dated Jan. 30, 2019.

\* cited by examiner

| Section 110 Service Schedule and Offers Server 108 (Dave) | |
|---|---|
| Time | Message |
| 1:00-1:30 | Concession server here $1.00 off coke |
| 1:30-2:00 | Concession server is here hamburgers $3.50 |
| 2:00-2:30 | Half time peanuts $2.00/bag, concession server here |
| 2:30-3:00 | Last call from concession server |

300

WIRELESS CONCESSION DELIVERY

CROSS-REFERENCE TO RELATED APPLICATIONS

The present application claims the priority benefit of U.S. provisional application No. 62/008,491 entitled "Concession Server Links to VLC Messaging" and filed Jun. 5, 2014.

BACKGROUND OF THE INVENTION

Field of the Invention

The present invention generally relates to provisioning of services using wireless and location based technologies. The present invention more specifically relates to delivering concessions and other "game day" related deliverables using such technologies to inform the recipient as to the availability of concessions and related deliverables and information ancillary thereto, including the time and place of such delivery.

Description of the Related Art

Almost every sporting event involves the acquisition or delivery of one or more concessions during the course of that event. These concessions typically include food stuffs and snacks, but also include beverages and alcohol and, in some instances, gifts or souvenirs. Concessions are typically offered, acquired, and delivered in one of two ways.

In a first example, an attendee of a sporting event—such as a baseball or football game—visits a concession stand. The concession stand includes a listing or menu of offerings such as food items and beverages. The attendee orders from the menu, pays a concession stand attendant, and returns to their seats with the ordered and paid for items.

This methodology of acquiring concessions and souvenirs is problematic, however, in that the attendee must wait in line to place the order, which can cause the user to miss portions of the sporting event and otherwise adds to line traffic and stadium or venue crowd and flow control problems. Problems may also arrive with payment in that the concession stand only accepts cash, the stand might temporarily be out of stock of certain items, or the stand only offers a certain subset of items when the attendee desires a concession not available at a particular stand. The attendee is also required to return to their seat with their hands full of foodstuffs and concessions, which can be problematic at a crowded sporting event.

In a second example, an attendee remains at their seat but an attendant comes to the attendee to take their order much like a waiter in a restaurant. While such a methodology avoids the problems of carrying food stuffs back to the seat or waiting in line, the attendee must still wait for delivery of concessions or souvenirs. The attendant delivering the concessions may also be different than the attendant that took the order thereby leading to confusion with delivery and locale of the attendee receiving the concessions. The attendee may not know what food items are available from a particular attendant, the order or delivery attendant may not always be available, and payment and inventory issues may continue to exist.

There is a need in the art for improved offering and delivery of concessions and souvenirs to attendees at a sporting or other public event offering such concessions.

SUMMARY OF THE CLAIMED INVENTION

In a first embodiment, a wireless concession system that transmits the availability of various concessions from both mobile vendors as well as actual concession stands is claimed.

DETAILED DESCRIPTION

Embodiments of the present invention include a wireless concession system that transmits the availability of various concessions from both mobile vendors as well as actual concession stands. The system identifies the location of these concession offerings in real time as well as up-to-date status information concerning the same. Wireless transmission of information concerning an attendee at a sporting event may likewise be broadcast to the concession system such that delivery of a desired concession may take place using an optimal delivery method, which could be delivery or pick-up at a location most near and most efficient for the needs of the attendee.

Figure 1:
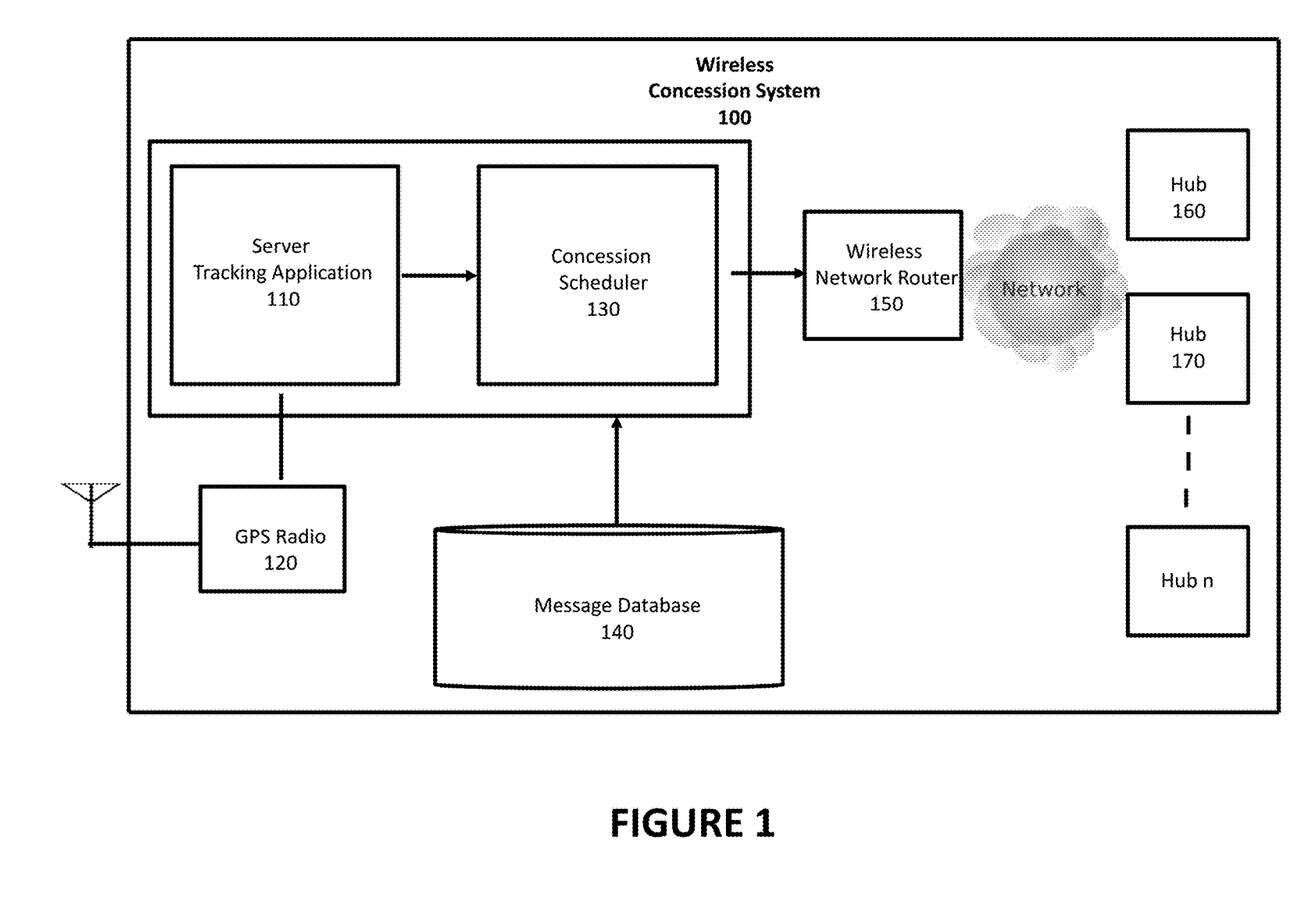
FIG. 1 illustrates a wireless concession system.

FIG. 1 illustrates a wireless concession system 100. The wireless concession system 100 of FIG. 1 includes a server tracking application 110 that operates in conjunction with global positioning system (GPS) radio 120. Server tracking application is communicatively coupled concession scheduler 130. The server tracking application 110 and concession scheduler 130 are likewise communicatively coupled to message database 140. The wireless concession system 100 also includes wireless network router 150 and various wireless hubs or access points 160, 170 . . . n.

Server tracking application 110 and concession scheduler 130 operate as software applications in a server setting. Such a server may be operated by a stadium authority, concession service operator, individual concession stand, or a party making souvenirs or other goods available within a stadium or venue. The present wireless concession system 100 may be implemented in the context of any variety of entertainment or cultural events that are presented at a theater, gymnasium, stadium, or other facility to a group of attendees.

Such events include but are not limited to sporting events such as football (both American and European), baseball, basketball, ice hockey, lacrosse, rugby, cricket, tennis, track and field, golf, cycling, horse racing, the Olympics, and motor sports such as automobile or motorcycle racing. The wireless concession system 100 might also be implemented at concerts, music festivals, plays, or the opera. The present system 100 could also be scaled to religious events or permanent exhibitions such as a museum or historic locale.

The server tracking application 110 and concession scheduler 130 may be stored in memory of the aforementioned server and executable by a processing device to make available certain information concerning the availability of concessions, the location of those concessions, and a schedule or time table at which those concessions may be available. Message database 140 operates in conjunction with the server tracking application 110 and concession scheduler 130 to provide information to a venue attendee concerning the availability of the aforementioned concessions and potential special offers such as coupons, deals, or upcoming or limited time special offerings.

Server tracking application 110 also operates in conjunction with the aforementioned GPS radio system 120. GPS radio identifies the location of various concession servers—individuals within a stadium or venue that are making available, taking orders for, or delivering concessions or other goods. The GPS radio system 120 operates in conjunction with the basic principles of the global positioning system concerning identification of the latitude and longitude of a concession server.

The GPS radio system 120 typically operates within a "worst case" pseudo-range accuracy of 7.8 meters. Various augmentation systems may be used in conjunction with the GPS radio system 120 to improve the accuracy, availability, and timing of global positioning system information. For example, the GPS radio system 120 normally relies solely on radio indicators from GPS units operating in conjunction with GPS satellites. GPS units may be integrated into mobile device such as mobile phones, tablet device, individual tracking chips, or other hardware devices that might be used to aid in the concession order taking process such as a mobile point of sale system. By operating in conjunction with triangulation data from cellular base stations or beacon or address information that might be derived from specific wireless devices or wireless hubs or access points in a wireless network, the accuracy and time to first fix of the GPS radio system 120 may be improved.

Latitudinal and longitudinal information generated by GPS radio system 120 and any augmentation devices or applications are assigned to individual concession servers and fed into server tracking application 110. Server tracking application 110 thus knows the real-time position of any concession server in a stadium or venue. Server tracking application 110 may then share this information with concession scheduler 130 to determine what concessions are presently offered by a particular server and where that server is offering those concessions.

The concession scheduler 130 may then broadcast, multicast, or unicast that information (generally referenced as a transmission) to interested parties at a stadium or venue through wireless network router 150 and various wireless hubs or access points as is further described herein. Such transmissions may include information from message database 140, which may include special offers or deals as well as general availability and schedule information concerning concessions or souvenirs. Message and other information in message database (such as special offers) may be updated through a user interface by the stadium authority, concession service operator, individual concession stands, or a party making souvenirs or other goods available within a stadium or venue.

Wireless network router 150 receives information generated by the server tracking application 110, GPS radio system 120, concession scheduler 130, and message database 140. Wireless network router then broadcasts, multicasts, or unicasts that information to individual wireless network hubs or access points within the stadium or venue. Wireless network router 150 may address certain information to only certain hubs or access points 160, 170 . . . n within the venue.

For example, a particular concession server may be assigned to and servicing Section 101 and Rows 1-10 of a particular stadium. It would be pointless for the wireless network router 150 to broadcast information concerning that concession server to individuals seated in Section 320 and Rows 11-20 as they are not able to take advantage of the concession or souvenir offerings of that particular server due to the distance of the same. Because the GPS radio system 120 is tracking the locale of particular concession servers using the GPS system or other augmentation services and the server tracking application is cataloging what server is currently in what section or assigned to a particular section, the wireless concession system 100 can avoid unnecessarily transmitting information concerning unavailable servers to venue attendees unable to take advantage of the particular offerings of a given server.

Further because the server tracking application 110 is aware (by way of GPS radio system 120) of the location of all servers, the concession scheduler can execute to create time tables and schedules of when a particular server will be in a particular locale and with what particular concessions (e.g., cotton candy versus churros versus soda). The wireless network router 150 can then transmit this information to attendees in a particular locale through the use of location specific wireless hubs or access points 160, 170 . . . n. And through use of messaging database, specials can be broadcast to particular individuals in those sections of the venue as well as overall delivery schedules, menus of available options, and the costs of the same.

For example, if Section 101 and Rows 1-10 are high end seats (e.g., several hundreds of dollars), then messages related to particular "high roller" or "special access" events that will cost significant amounts of money can be broadcast to attendees in these sections. Such information would likely be of little value to a stadium attendee in "standing room only" or $5 bleacher seats. Attendees in these sections may be more interested in special discounts or deals related to concessions.

Wireless network hubs or access points 160, 170 . . . n may be positioned throughout a venue and tasked with distributing information to attendees in a particular section. Wireless network hubs or access points 160, 170 . . . n may be accessed through the use of section specific SSIDs and password combinations that can be printed on user tickets (either paper or digital), engraved or otherwise made available specifically at a seat (e.g., on a digital kiosk or embedded seat plate like those indicating section, row, and seat), or through mobile applications executing on a user mobile device or some other device available at the seat of a venue attendee (e.g., a menu ordering display).

Various wireless technologies may be used in the context of the wireless concession system 100 of FIG. 1. Examples of such networks and protocols include 802.11 wireless networks, Bluetooth networks, visible light communication (VLC) networks and bulbs, IrDA, Li-Fi, cellular, or RONJA. Specialized wireless access points and hubs may be used to further increase the accuracy and specificity of transmitted information including directional antennas in the context of 802.11 networks or section specific VLC bulbs in the case of a VLC network.

Figure 2:
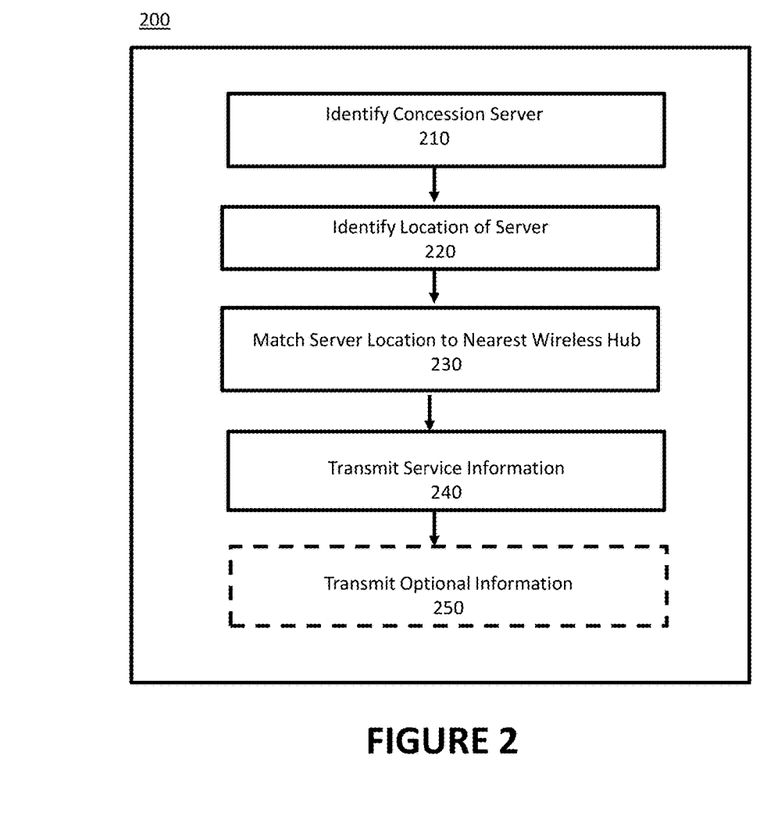
FIG. 2 illustrates a workflow for concession scheduling.

FIG. 2 illustrates a workflow 200 for concession scheduling. In step 210 of FIG. 2, the identification of a particular server (or concession stand) is identified. Server (or concession stand) identifiers are specific to a server or concession stand based on the tracking implementation associated with the same. Such implementations may be a GPS tracking chip or other identifying location beacon as may be broadcast or provided by a mobile device such as a mobile point of sale system or mobile device. Using the GPS radio system 120 as illustrated in FIG. 1, the location of the server may be identified in conjunction with the server tracking application 110 of FIG. 1. Server identification in step 210 may be part of a continual polling process, a concession server/stand based check in, or a wireless concession system server query requiring a response from the server.

In step 220, and following identification of a particular concession server (or concession stand), the location of that identified server is identified. Identification of server location is accomplished (again) using the GPS radio system 120 and server tracking application 110 of FIG. 1. Once the location of a server (or series of servers) is identified by the server tracking application 110 and GPS radio system 120 of FIG. 1, each server is matched to a wireless hub or access point like hubs 160 and 170 of FIG. 1.

Matching of servers to wireless hubs is accomplished through execution of the concession scheduling application 130 of FIG. 1. Concession scheduling application 130 has access to a stored location map of pre-existing wireless hubs or access points. Alternatively, the application 130 has access to a mapping of sections or portions of a stadium or venue and the wireless hub or access point associated with the same. Access points and hubs are typically stationary. Matching of a particular server or concession identifier to a particular hub involves the correlation of the smallest delta of distance between a mobile server (or concession stand) having latitude and longitude information and the otherwise stationary wireless hub or access point.

Once a concession stand or server identifier has been matched with a particular wireless hub or access point (or stadium section having a wireless hub or access point) at step 230, service information may be transmitted at step 240. Transmission of service information occurs as an operation of the concession scheduling application 130 operating in conjunction with the message database 140 of FIG. 1. Service information may include arrival time of a server, arrival time of a pre-existing order, menu or souvenir offerings of a particular server, and the actual location of the matched server with respect to the access point or hub.

Service information may be tailored to particular wireless hubs or access points, particular sections, particular customers, or particular orders of customers. Customer orders may be delineated or receipts or service orders, ticket numbers, seat numbers, or some other identifier including mobile applications having a unique login or user identifier, or the MAC address of the mobile device hosting and executing the application. Information retrieved from message database 140 may be keyed against a particular application operating on a particular mobile device of a particular user such as VIP users, season ticket holders, or other types of guests at the venue such as large groups or persons celebrating a special occasion.

Optional information may be transmitted at step 250 of FIG. 2. Optional information includes any information not essential to completion of the order but that might otherwise be associated with or complementary of the same. For example, optional information may include coupons, deals, limited time offers, or other offerings from the stadium authority, concession service operator, individual concession stand, or a party making souvenirs or other goods available within a stadium or venue.

As previously noted, transmission of information (essential or optional) may be broadcast to an entire stadium but otherwise meant for attendees associated with a particular wireless hub or access point. Transmissions may also be multicast such that only particular access points or hubs, or mobile applications associated with a particular access point or hub, receive the same. Transmissions may also be unicast such that only specific users receive a message notwithstanding their association with a particular access point or hub such that the access point merely acts as a wireless bridge and the user receives a specially keyed message that may only be accessed and displayed by a specific user application.

Figure 3:
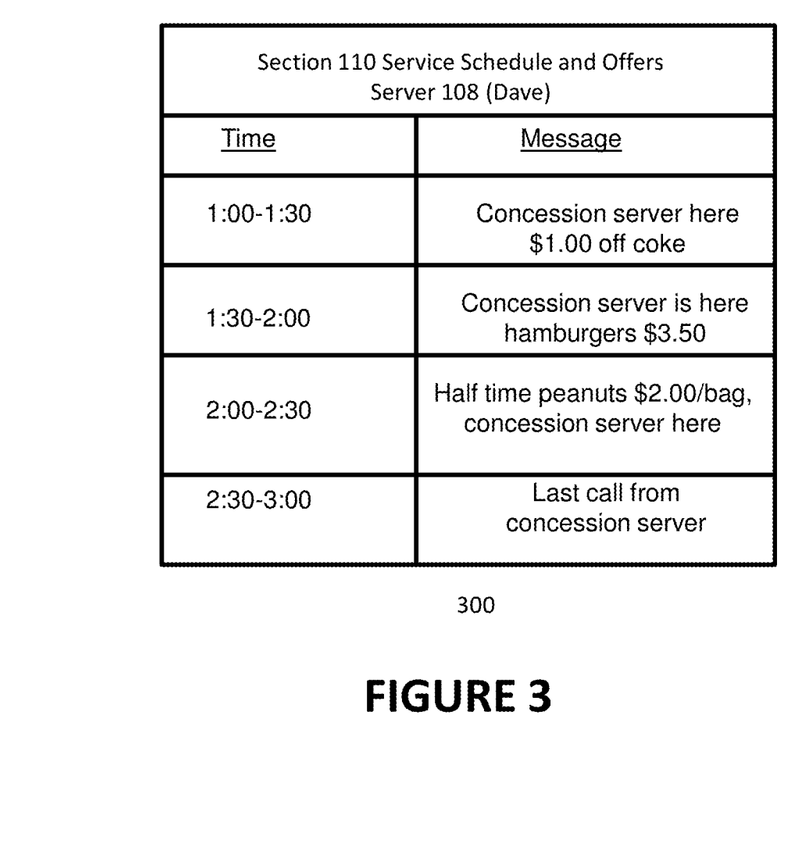
FIG. 3 illustrates an exemplary message that may be transmitted by concession scheduling application in conjunction with messaging database.

FIG. 3 illustrates an exemplary message 300 that may be transmitted by concession scheduling application 130 in conjunction with messaging database 140. The message 300 of FIG. 3 includes scheduling information for a particular stadium section and a particular server identifier that is associated with that section as a result of the workflow discussed in the context of FIG. 2. The message 300 of FIG. 3 also illustrates additional information such as special deals ($1.00 off a soda) in addition to the pricing of particular goods ($3.50 hamburgers).

The components of the system illustrated and described in FIG. 1 are those typically found in computer systems and are intended to represent a broad category of such computer components that are well known in the art. Thus, the system 100 of FIG. 1 can be implemented using different hardware configurations, networked platforms, and multi-processor platforms. Various operating systems may likewise be used.

Various flow diagrams have also been illustrated and described. It should be understood that such order is exemplary. Alternative embodiments can perform the operations in a different order, combine certain operations, or overlap certain operations. Such flow diagrams may be illustrative of executable instructions maintained in a non-transitory computer readable storage medium such as main memory or random access memory.

The foregoing detailed description has been presented solely for the purposes of illustration and description. It is not intended to be exhaustive or limiting. Modifications and variations are possible in light of the above teachings. The described embodiments were chosen to best explain the principles of the invention and its practical application as to allow others skilled in the art to best practice the invention and embodiments thereof. The scope of the present invention is to be limited solely by the following claims subject to proper construction of the same.

What is claimed is:

1. A system for providing tailored concession information, the system comprising:
   a plurality of section-specific directional wireless hubs in an event venue, each of the plurality of section-specific directional wireless hubs transmitting information to a different section of a plurality of sections of the event venue;
   one or more global positioning system (GPS) receiver devices that track one or more locations, each location corresponding to one of the one or more concession providers in the event venue;
   a database that provides concession inventory information in relation to the one or more concession providers;
   a memory that stores instructions;
   a processor that executes the instructions, wherein execution of the instructions by the processor causes the processor to:
      receive the one or more locations corresponding to the one or more concession providers from the one or more GPS receiver devices,
      retrieve the concession inventory information from the database,
      generate a concession schedule using the concession inventory information and the one or more locations corresponding to the one or more concession providers by applying concession provider association rules to the one or more locations corresponding to the one or more concession providers, the concession schedule indicating when a first concession provider will be in a first section of the plurality of sections within the event venue that includes one or more seats, the one or more seats in the first section associated with one or more venue attendees via one or more tickets, the concession schedule also identifying a first inventory of the first concession provider, generate a message based on the concession schedule, the message identifying when the first concession provider will be in the first section based on the concession schedule, and match the message to a first section-specific directional wireless hub of the plurality of section-specific directional wireless hubs based on a delta of distance between the first section-specific directional wireless hub and the first section; and a router that delivers the message to the first section-specific directional wireless hub for subsequent transmission of the message by the first section-specific directional hub to one or more user devices located within the first section and associated with the one or more venue attendees associated with the first section, wherein the one or more user devices obtain access to the message using one or more ticket identifiers from the one or more tickets.

2. The system of claim 1, wherein predicted location information for the one or more concession providers is used to generate the concession schedule and the message, the predicted location information generated by applying the concession provider association rules to at least the one or more locations corresponding to the one or more concession providers.

3. The system of claim 2, wherein the predicted location information is updated based on changes to the one or more locations corresponding to the one or more concession providers over time.

4. The system of claim 1, wherein the message further identifies an inventory of the first concession provider based on the concession inventory information.

5. The system of claim 1, wherein the message includes a limited time offer associated with the first concession provider.

6. The system of claim 1, wherein matching the message to the first section-specific directional wireless hub is based on the first section-specific directional wireless hub having the smallest delta of distance to the first section.

7. The system of claim 1, wherein the one or more locations corresponding to the one or more concession providers are made more accurate based on triangulation of the one or more GPS receiver devices using a plurality of cellular base stations.

8. The system of claim 1, wherein the first section-specific directional wireless hub includes at least one directional antenna.

9. The system of claim 1, wherein the message is personalized for a first user device associated with a first venue attendee of the one or more venue attendees.

10. The system of claim 1, wherein at least one of the one or more ticket identifiers includes a password.

11. The system of claim 1, wherein the first section-specific directional wireless hub includes at least one bulb that communicates using a light-based communication protocol.

12. A method for providing tailored concession information, the method comprising:

receiving, from one or more global positioning system (GPS) receiver devices, one or more locations corresponding to one or more concession providers in an event venue, each location corresponding to one of the one or more concession providers in the event venue;

storing, in a database, concession inventory information in relation to the one or more concession providers;

executing instructions stored in memory, wherein execution of the instructions by a processor causes the processor to:

retrieve the concession inventory information from the database, generate a concession schedule using the concession inventory information and the one or more locations corresponding to the one or more concession providers by applying concession provider association rules to the one or more locations corresponding to the one or more concession providers, the concession schedule indicating when a first concession provider will be in a first section of a plurality of sections within the event venue that includes one or more seats, the one or more seats in the first section associated with one or more venue attendees via one or more tickets, the concession schedule also identifying a first inventory of the first concession provider, generate a message based on the concession schedule, the message identifying when the first concession provider will be in the first section based on the concession schedule, and match the message to a first section-specific directional wireless hub of a plurality of section-specific directional wireless hubs in the event venue based on a delta of distance between the first section-specific directional wireless hub and the first section, each of the plurality of section-specific directional wireless hubs transmitting information to a different section of the plurality of sections of the event venue; and delivering the message to the first section-specific directional wireless hub for subsequent transmission of the message by the first section-specific directional hub to one or more user devices located within the first section and associated with the one or more venue attendees associated with the first section, wherein the one or more user devices obtain access to the message using one or more ticket identifiers from the one or more tickets.

13. The method of claim 12, wherein the message further identifies an inventory of the first concession provider based on the concession inventory information.

14. The method of claim 13, wherein the message includes a limited time offer associated with the first concession provider.

15. The method of claim 12, wherein matching the message to the first section-specific directional wireless hub is based on the first section-specific directional wireless hub having the smallest delta of distance to the first section.

16. The method of claim 12, wherein the one or more locations corresponding to the one or more concession providers are made more accurate based on triangulation of the one or more GPS receiver devices using a plurality of cellular base stations.

17. The method of claim 12, wherein the message is personalized for a first user device associated with a first venue attendee of the one or more venue attendees.

18. The method of claim 12, wherein at least one of the one or more ticket identifiers includes a password.

19. A non-transitory computer-readable storage medium having embodied thereon a program executable by a processor to perform a method for providing tailored concession information, the method comprising:

receiving, from one or more global positioning system (GPS) receiver devices, one or more locations corresponding to one or more concession providers in an event venue, each location corresponding to one of the one or more concession providers in the event venue;

storing, in a database, concession inventory information in relation to the one or more concession providers;

retrieving the concession inventory information from the database;

generating a concession schedule using the concession inventory information and the one or more locations corresponding to the one or more concession providers by applying concession provider association rules to the one or more locations corresponding to the one or more concession providers, the concession schedule indicating when a first concession provider will be in a first section of a plurality of sections within the event venue that includes one or more seats, the one or more seats in the first section associated with one or more venue attendees via one or more tickets, the concession schedule also identifying a first inventory of the first concession provider;

generating a message based on the concession schedule, the message identifying when the first concession provider will be in the first section based on the concession schedule;

matching the message to a first section-specific directional wireless hub of a plurality of section-specific directional wireless hubs in the event venue based on a delta of distance between the first section-specific directional wireless hub and the first section, each of the plurality of section-specific directional wireless hubs transmitting information to a different section of the plurality of sections of the event venue; and delivering the message to the first section-specific directional wireless hub for subsequent transmission of the message by the first section-specific directional hub to one or more user devices located within the first section and associated with the one or more venue attendees associated with the first section, wherein the one or more user devices obtain access to the message using one or more ticket identifiers from the one or more tickets.

20. The non-transitory computer-readable storage medium of claim 19, wherein the message further identifies an inventory of the first concession provider based on the concession inventory information.

* * * * *